April 2, 1968     E. T. VENEMARK     3,376,102
METHOD OF REMOVING VOLATILE ACIDS FROM VAPORS
IN THE MANUFACTURE OF SULPHATE CELLULOSE
Filed May 9, 1966     3 Sheets-Sheet 1

INVENTOR
EMIL TEODOR VENEMARK, DECEASED
BY RUT VENEMARK, LEGAL REPRESENTATIVE

BY Albert M. Parker
ATTORNEY.

3,376,102
METHOD OF REMOVING VOLATILE ACIDS FROM VAPORS IN THE MANUFACTURE OF SULPHATE CELLULOSE
Emil Teodor Venemark, deceased, late of Ornskoldsvik, Sweden, by Rut Venemark, legal representative, Lund, Sweden, assignor to Mo och Domsjo Aktiebolag, Ornskoldsvik, Sweden, a limited company of Sweden
Continuation-in-part of application Ser. No. 176,083, Feb. 27, 1962. This application May 9, 1966, Ser. No. 559,704
Claims priority, application Sweden, Feb. 28, 1961, 2,133/61
12 Claims. (Cl. 23—2)

ABSTRACT OF THE DISCLOSURE

Method of removing volatile acidic compounds such as hydrogen sulfide and mercaptans from vapors produced during the sulfate pulping process which comprises atomizing an aqueous alkali solution into a stream of the vapors containing the volatile acidic compounds in a volume ratio of alkali solution to vapor of about 0.15 to about 1 liter per cubic meter at a rate of at least 5 meters per second at an alkali solution load of at least 250 liters per minute per square meter to form a final alkali solution having a pH of at least 8.

---

Figure 1:
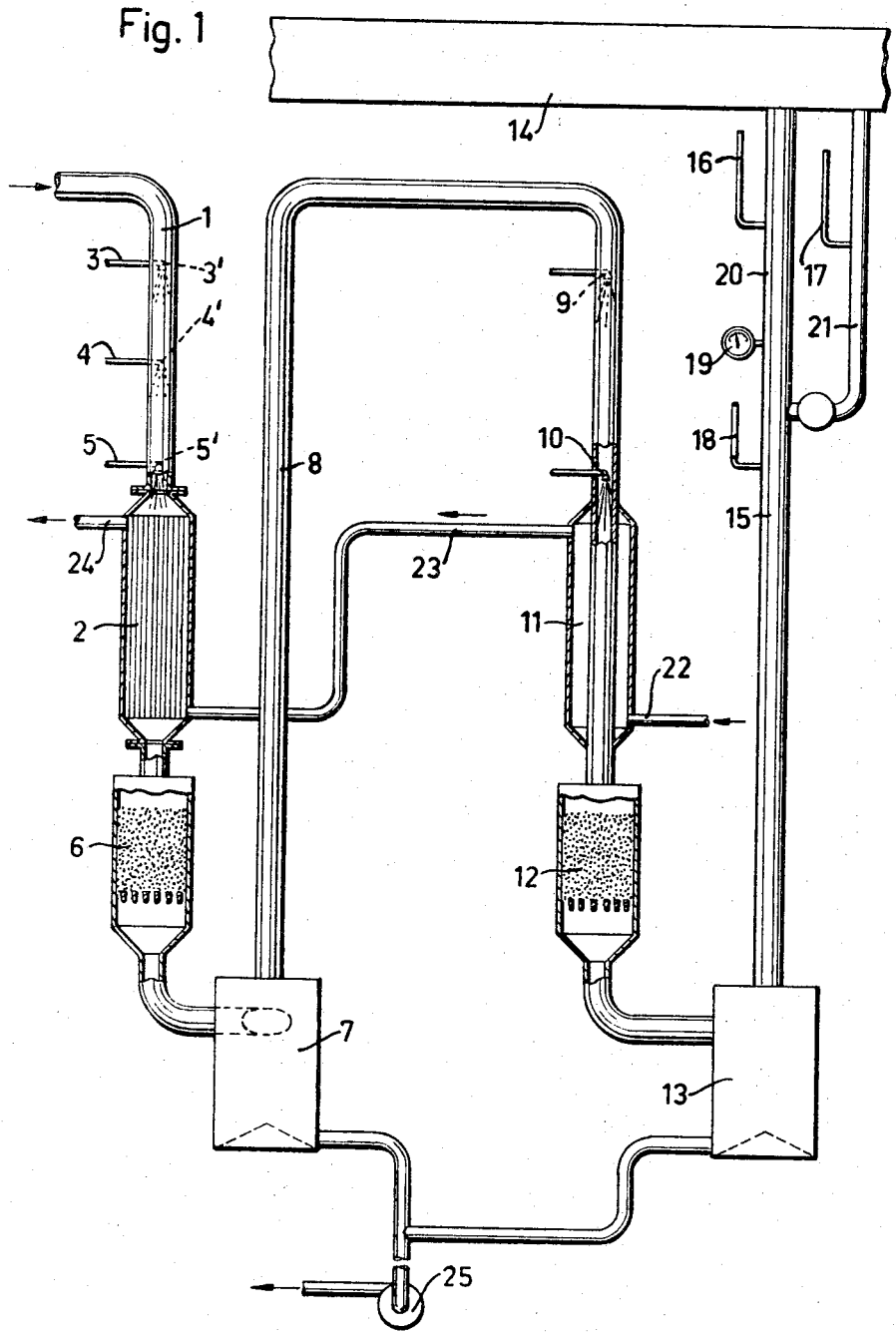

This application is a continuation-in-part application of U. S. Ser. No. 176,083, filed Feb. 27, 1962, and now abandoned.

This invention relates to a method of removing volatile acidic compounds and droplets thereof from vapors other than flue gases, such as relief and blow gases from digesters and vapors from black liquor evaporation, as well as liquids and condensates containing the same, produced during the sulphate cellulose pulping process, in such a way that the compounds can be recovered as moderately diluted solutions of salts, and if necessary fractionated to some extent in accordance with the acidity and/or volatility of the compounds. This is of particular importance so as to eliminate difficulties arising from their capacity to absorb oxygen or their odor.

Segerfelt in U.S. Patent No. 1,854,428 describes a method for removing hydrogen sulfide, mercaptans and organic sulfur compounds from flue gases mixed with other gases obtained in sulfate and soda pulp manufacture. Segerfelt contacts the gases at a very slow flow rate, below 0.5 m./sec., with various absorbents, including aqueous alkali, commenting that a higher flow velocity of 4 m./sec. gives a very low efficiency of removal of such components. Segerfelt therefore suggests an apparatus of large volume capacity, to enable the processing of large volumes of gas at slow rates.

In accordance with the instant invention, it has been determined that a high efficiency of removal of volatile acidic compounds can be obtained, if the gases and vapors are contacted with aqueous alkali in atomized form while flowing them at a high velocity of at least 5 m./sec. up to about 50 m./sec. The alkali should be fed in a volume ratio of alakli solution:vapor of at least 0.15 l./m.$^3$, up to about 1. l./m.$^3$.

The final alkali solution should have a pH of at least 8, and the alkali and vapors should be blended at a rate such that the alkali solution load in the vapor is within the range from about 250 l./min./m$^2$ to about 2000 l./min./sq. m. In this way, it is possible to obtain complete wetting of the vapors with the alkali solution, and the droplets of alkali solution in atomized form are entrained in the vapors, due to their small size and the space velocity of the gas, with the result that thorough scrubbing of the gases is obtained. The droplets of alkali can be separated from the gases, using conventional techniques, and the alkali can be recovered for reuse, and for the preparation of liquids for digesting purposes.

The invention thus is based on absorption of the volatile acidic compounds in a solution or lye containing free alkali, which is injected in an atomized state into the vapors containing the compounds, after which the absorbate is separated therefrom. When the absorbate is to be recovered it is often desirable that the vapor, optionally concentrated by partial condensation, be freed from droplets of liquid. The degree of atomization (subdivision) of the injected alkali is adjusted to the efficiency of the method of separation. In favourable cases, when a major portion of the vapors is condensed, the alkali can be as finely divided as technical resources permit. It is often possible to effect the absorption in a heat exchanger, which, to increase the absorption efficiency is designed so as to trap the droplets of liquid, for example, on the outer surface during the rotary travel in a spiral condenser, or on the transfer surfaces of a plate heat exchanger by means of baffles which change the direction of travel one or more times. At moderate gas concentrations in the vapor, condensation of the vapors on cooling surfaces can result in such a complete precipitation of even finely divided droplets of liquid that other methods of separation are unnecessary. This is of great importance when the concentration of non-condensible gas is high.

By dividing the process into stages and introducing an insufficient amount of alkali during the first stage, it is possible, for example, to obtain a solution of the salts of the stronger (possibly also less volatile) acidic compounds in the first stage and then, by injecting more alkali, if desired an excess quantity thereof, in a later stage, to recover the weaker acids and those of the stranger acids not previously absorbed. It is also possible of course to inject the alkali mixed with absorbate previously obtained from a previous, the same, or a succeeding stage. By allowing the absorbate from the stage previous to that during which the alkali is injected to come into contact with the vapors, in a column, for example, a concentrated and optionally also hot solution of the strongest (and least volatile) acidic compounds can be obtained. Depending upon the operating conditions, it is possible to combine the process with methods adapted to improve the stripping of the acidic compounds from the liquids or condensates from the process in which they are produced. The vapors can often be obtained in concentrated form by avoiding unnecessary dilution with air, and certain vapors can be concentrated by partial condensation prior to the preliminary separation of the droplets of liquid before injection of the alkali solution.

The alkali solution is an aqueous solution containing at least 40 g./l. of alkali calculated as sodium hydroxide, NaOH. The concentration can be well in excess of this, which is the recommended minimum, intended to keep the amount of circulating water at a minimum, and can range up to a saturated solution, but usually will not exceed a concentration giving a workable viscosity. In the case of NaOH, the maximum is about 500 g./l. and preferably from 100 to 250 g./l. is used.

As the alkali, there can be used any strong alkali, including not only sodium hydroxide but also alkaline liquors from various steps in the pulping process, such as strong white liquor prepared for digestion of pulp, weak white liquor from the causticizing process, concentrated green liquor, weak green liquor from dregs washing in the recovery process, and other alkaline sodium salts such as sodium carbonate, and sodium sulfide. The potassium compounds such as potassium hydroxide and the corresponding potassium alkaline liquors and salts, and the corresponding lithium and calcium compounds, also can be used, although they are more expensive.

The scrubbing can be effected at room temperature with good efficiency, but normally the temperature is sufficiently elevated to ensure that all components are extracted before appreciable condensation of water takes place. This prevents the formation of a condensate containing a high proportion of the components being removed, and also prevents dilution of the scrubbing liquor by such condensate.

Of course, the use of low pressures makes it possible to use lower temperatures, since the boiling point of water and other components is correspondingly lowered. Thus, while atmospheric pressure can be used, it is frequently desirable to use a sub-atmospheric pressure ranging down to as low as 50 mm. Hg or even less, although it is rarely necessary to use a pressure below 100 mm. Hg. Superatmospheric pressures ranging up to 10 atmospheres also can be used.

The process is best illustrated by reference to certain examples from the sulphate cellulose pulping process. During the process by-product substances are obtained in the aqueous liquors which have a high oxygen demand (B.O.D). and which are often poisonous together with malodorous gaseous substances.

During the initial pulping stage, vapor is relieved to remove air, and, when using coniferous woods, recover turpentine. Ill-smelling neutral sulphur compounds have only been formed in small amount and the content of hydroxide in the cooking liquor is still so high that only small quantities of volatile acidic compounds are released. This means that in many cases no special arrangements are necessary to purify the relief gases and condensates. When the pulping process has been terminated after having been conducted for the desired time at the maximum temperature it is usual to relieve vapor so that the pressure is reduced to a level suitable for blowing the cook and further quantities of the remaining turpentine are recovered. This vapor, which often amounts to about 500 kgs. per ton of pulp, contains turpentine, turpentine alcohols and the like, also most of the very weak acids, mercaptans, the neutral substances, dimethyl sulphide and dimethyl disulphide, as well as hydrogen sulphide, methanol, ammonia and other substances. After separation of entrained cooking liquor the vapor is condensed and the condensate is fractionated into an oil layer containing the turpentine compounds and, when the fractionation is carried out properly, most of the organic sulphur compounds, and a water layer containing hydrogen sulphide, mercaptans and non-separated oil enriched with ill-smelling compounds. If the air in the digester has been evacuated earlier there is no air contamination when condensing, but the turpentine phase has a very bad odor and the water phase often contains the highest concentration of poisonous compounds in a sulphate mill. One method of obtaining a purified condensate is described in connection with FIGURE 3. The treatment of the turpentine phase is part of the technique of purifying turpentine but the present method also enables the production of dimethyl sulphide with a low mercaptan content. When blowing the digester a large amount of steam is released containing hydrogen sulphide, mercaptans, and other volatile compounds which have not been removed in the previous gas relief. After the black liquor and pulp have been removed, the vapor is generally condensed in a jet condenser. Since as a rule the water is slightly alkaline owing to the presence of traces of alkali, most of the hydrogen sulphide and the mercaptans are dissolved in the condensed water phase and the organic compounds are partially emulsified therein. The treatment of the incondensible gases is dealt with in connection with FIGURE 2. The contaminated condensate is generally used directly to wash the pulp and the impurities mainly pass into the black liquor. In filter washing, some of the vapor passes into the vented air, and can be dealt with as in FIGURE 2.

The major portion of the poisonous matter and volatile substances consuming oxygen which is not separated as an oil phase is generally released during the evaporation of the black liquor, when the post-washing concentration of 12–25% solids content is brought to 55–60% solids content at which the liquor is suitable for burning. The vapor released during the concentration of the black liquor often contains 0.5–2 g. hydrogen sulphide per kg. of evaporated water. The vapor from the highest temperature stage is condensed in the lowest subsequent stage, the vapor from this stage is condensed in the next lowest stage, and so on. If the condensates thus obtained are free from black liquor entrained in the vapor, more than 90% of the hydrogen sulphide is expelled during the degassing, which has to be carried out to ensure that the condensing process is not hampered by a layer of gas on the heat transfer surfaces. This degassing is particularly suitable when using the process described and further illutrated in FIGURE 1.

A small quantity of hydrogen sulphide is released into the air during the production of tall oil on acidifying the sulphate soap (skimmings), usually containing black liquor. The vapor can be treated as described in FIGURE 2.

If it is desired to wash the pulp with pure water, the excess of impure condensate from relief gases, blow gases, black liquor evaporation, etc., is recovered as hot as possible, acidified to pH 6 or lower, and stripped, preferably under vacuum, and the stripped vapors thus obtained treated as in FIGURE 1. In this way, water pollution by such condensates is minimized.

It is evident that nothing is gained by obtaining the ill-smelling and poisonous substances in the form of very dilute solutions. They can certainly be destroyed by oxidation by air, chlorine, etc., or by biological treatment, but such destruction is expensive or complicated. It is instead desirable to obtain the main part of the acidic impurities in a form such that they can be returned to the production process without involving undue costs. It is also of economic advantage if the alkali used to remove malodorous acidic impurities can be recovered in concentrations of preferably more than 25 g. of active alkali per liter. Certain relatively large, but nevertheless limited, quantities of slightly impure water can be used for washing pulp and sludge (calcium carbonate), when the impurities and the alkali are for the most part, or even completely, transferred to the black lye and the white lye, respectively. However, it is desirable to obtain most of the impurities dissolved in the alkali in a concentration such that the substances can be introduced directly into the digester together with the white lye and, in most cases, so as to replace other alkali. This can be done in the process described which is a distinct advantage.

In multi-stage evaporation of non-oxidized black lye, steam containing small quantities of mercaptan (degassing steam) must be drawn off from all lye vapor chambers i.e. from all heating steam chambers of the several stages supplied with lye vapor as heating medium, so as to prevent the formation of layers of gas on the heating surfaces, which would hamper the heat transfer process. A very good method of achieving this is described in Swedish Patent No. 137,956. According to this patent the relatively large amount of degassing steam, withdrawn from the heating steam chamber together with the heating steam condensate, is separated from the condensate outside said chamber and thereafter passed through a surface condenser, generally used as black liquor preheater, in which the degassing steam is condensed to such a degree that the rest of it, which is withdrawn from the condenser apart from the condensate formed therein, will contain a high concentration of uncondensible gases. In this way, it is often possible to increase the concentration of volatile acidic compounds to such an extent (50–150 g. hydrogen sulphide per kg. water) that the degassing vapor with advantage can be treated directly for recovery according to applicant's invention. If it is required to achieve an efficient heat transfer at the surface condensers by a lower concentration of uncondensible gases in the degassing vapors, or if it is desired to obtain very concentrated solution from the recovery of hydrogen sulphide, it is a good practice to allow the degassing vapors collected from all condensers to pass through a further surface condenser with, for example, cold water as coolant.

Figure 2:
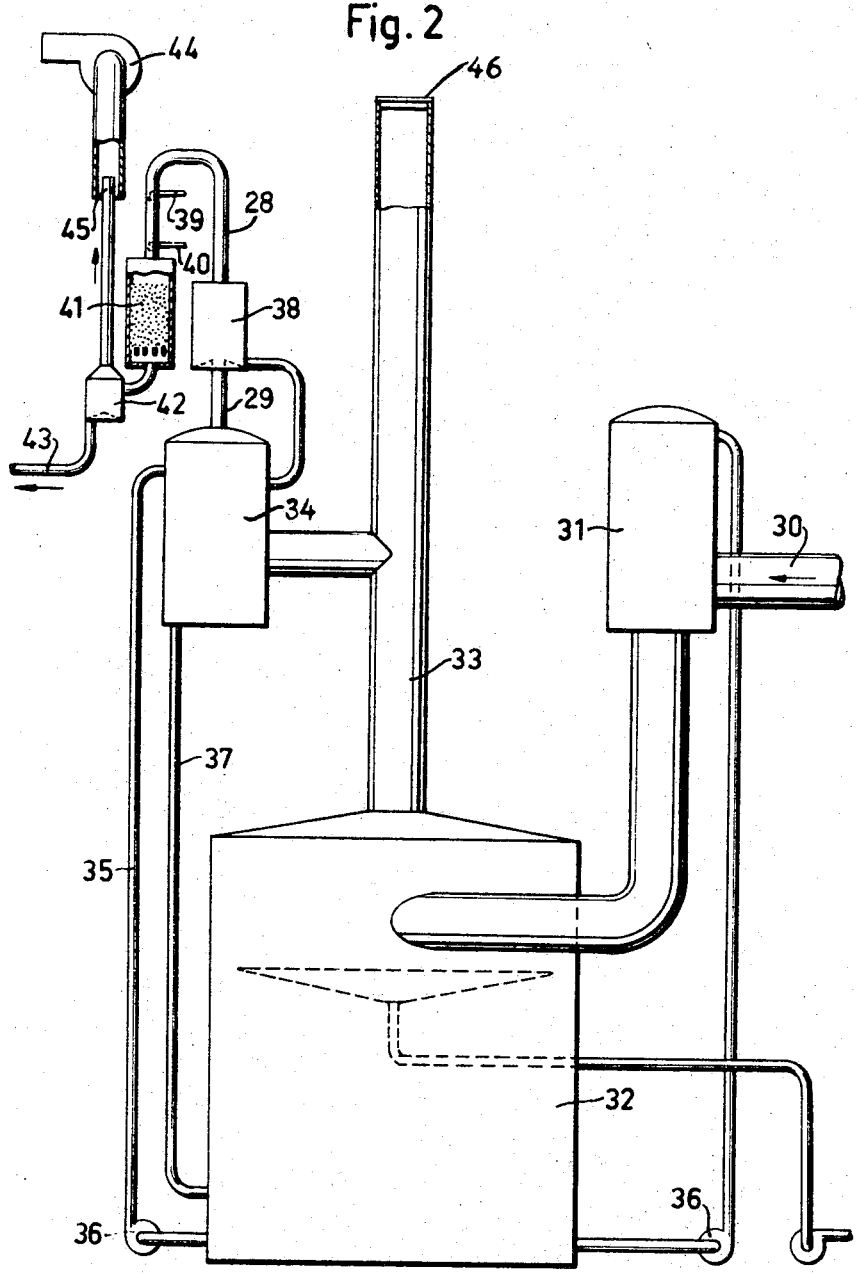
Figure 3:
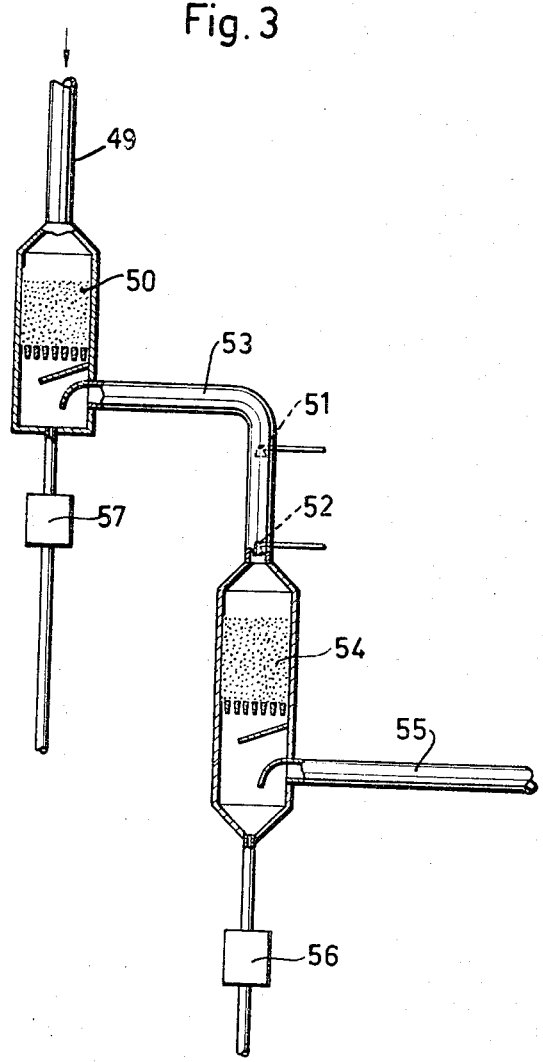

The accompanying drawings, FIGS. 1, 2 and 3, illustrate diagrammatically three embodiments of apparatus for performing the process according to the invention.

In the apparatus of FIGURE 1, the degassing vapors from all black liquor vapor chambers, preferably concentrated in one way or another, enter through a pipe 1 which leads to a heat exchanger in the form of a surface condenser 2. At the end of pipe 1, before the condenser 2, are pipes 3, 4, 5, through which alkali is supplied to spray nozzles 3', 4', 5' for atomization into the vapors in pipe 1. The pipe has a diameter of 200 mm. and the vapors are conducted through it at a rate of 21–40 m./sec. under a pressure of 200 mm. Hg. The droplets of alkali are introduced in a volume ratio of 0.2 to 0.5 l./m.$^3$ and are entrained in the vapors which gives a load of 250 to 500 l./min./m.$^2$. The hydrogen sulphide is absorbed by them, while the steam is condsensed on the heat transfer surfaces of the condenser 2, while the droplets of alkali are precipitated and form a film of liquid on said surfaces. If the concentration of uncondensible gas is high, a baffle or other means for changing the direction of flow of the vapor can be introduced to advantage. A coalescer 6, a very suitable form of which is an absorption column, as shown, is placed after the heat exchanger 2, to agglomerate small droplets. The condensate is separated in container 7, and the residual vapor and the uncondsensed gas pass upwardly through pipe 8. More alkali is injected into the vapor at the end of pipe 8 through spray nozzles 9, 10, after which the pipe enters a secondary condenser 11, which is connected to a second coalescer 12, and then to a liquid separator 13. The pipe 8 also has a diameter of 200 mm., and the vapors are conducted through it at a velocity of 10–25 m./sec. under a pressure of 200 mm. of Hg. The alkali droplets are entrained in the vapors as before. The uncondensed vapor passes upwardly through pipe 15 to main pipe 14 leading to the last condenser (not shown). The final condensate has a pH of 8 to 9.

Special investigations have shown that, provided that there are no air leakages, the uncondensible components of the entering vapor are composed of more than 90% hydrogen sulphide, less than 10% of mercaptans, mainly from the thin liquor stage, and less than 1% of neutral, uncondensible gases and vapors. It is suitable to provide pipe 15 to the last condenser with two connections 20, 21, the smaller of which is used during normal operation and the larger when there are large air leakages and possibly also when starting. Gauges 16, 17 measure the quantity of residual gas and a thermometer 18 and pressure gauge 19 also are provided. The absorption or scrubbing liquor is transferred to the white liquor system by the pump 25. The cooling water for the condensers 2 and 11 is introduced to condenser 11 by pipe 22, transferred to condenser 2 by pipe 23 and lead to the hot water system by pipe 24.

The invention is not limited to the use of the two absorption stages as illustrated and described in FIGURE 1. Absorption can be carried out in one stage, or in more stages than two.

FIGURE 1 shows the absorption liquid being injected in the vapor flow direction so as to permit high gas flow rates—but it can also be introduced in countercurrent flow. When injecting the absorption liquid in the vapor flow direction, it may be preferable to interpose a contact surface, for example, an absorption column, between the spray nozzles, especially when there is air in the system. The arrangement shown calls for fresh alkali solution, but the absorption liquid can also be piped from a later stage to an earlier stage. In this way a large excess of alkali can be used in the final stages or circulated within one stage with a draining off of a quantity of liquid corresponding to the addition of fresh solution and the formation of condensate. In the same way local conditions or special requirements may make other constructions advantageous.

If a very pure sulphide solution is required, for example, when manufacturing polysulphide according to Swedish Patent No. 160,736, or for obtaining the sulphide solution at the highest possible temperature, the liquid from the first absorption stage should be contacted with the untreated, impure vapor in a preabsorption vessel. This can be an absorption column of some kind which, in the simplest form, consists of counterflow sprays. If a pure sulphide solution is required, a surplus of alkali in the first stage (stages) should be avoided. The weakly acid mercaptans are then incompletely absorbed and stripped off in the preabsorption vessel, and subsequently absorbed by fresh alkali in the final stage or stages and drawn off separately, instead of as in the arrangement shown in FIGURE 1. While the usual absorption liquid is white liquor, if a pure sulphide solution is required, pure caustic solution should be used. This also permits a higher alkali concentration in the recovered liquid. Sodium sulphide can also be more or less completely converted into sodium hydrogen sulphide in the first stage (stages) or even in the preabsorption stage. The alkali concentration of the recovered liquid also depends upon the content of hydrogen sulphide in the degassing vapor.

| Ratio $H_2S/H_2O$ in degassing vapor, g./kg. | Concentration of active alkali (Calculated as grams of NaOH per liter) | | | |
|---|---|---|---|---|
| | Before | 500 | 250 | 100 | 100 |
| 100 50 | After | 150 90 | 110 75 | 65 50 | 90 70 |

The absorbent liquid can thus be used directly as the cooking liquor, and can be adjusted in alkali concentration by mixing with ordinary white liquor and, when required, with black liquor, in an amount dependent on the alkali concentration of the absorbent liquid. A special investigation has shown that mercaptans have about the same effectiveness as sodium sulphide in sulphate cooking liquor and that the content of mercaptans is not higher at the end of the cook than in ordinary cooking.

The use of the method according to the invention results in a reduction in the sulphur losses associated with the pulping process and an increase in the relative sulphidity (the ratio of sulphur to alkali) of the circulating liquor.

An increase in sulphidity often is self-limiting without involving unfavorable digesting conditions, and thus special measures to limit increase in sulphidity (such as conversion to free sulphur and carbonate) will only be necessary in exceptional cases.

Assuming good production conditions when manufacturing sulphate pulp, it may be expected that the process according to the invention will result in a recovery of more than 80% of the sulphur lost from the black liquor in a five-stage evaporation plant. Slightly less than half of the sulphur lost will be contained in the condensate, which generally can be used, so that the bulk is recovered with the black liquor or white liquor. Should it be necessary to dump some of it, the content of impurities will be so small that, as a rule, no inconvenience will be caused, and it will also be possible to destroy part of it by means of suitable oxidation with air or by means of some other oxidation agent. The remaining loss is in the vapor from the final evaporation stage and this can be dealt with in the same way as the degassing vapor from the black liquor steam chambers in the previous stages. In view of the fact that the absolute presusre is generally low, 75–200 mm. Hg, the vapors need not necessarily be concentrated and the content of impurities is relatively small, it is probable that it will be advantageous to refrain from removing this portion or destroying the harmful impurities in another way. If this quantity is to be removed, it can probably be best done in a separate unit as shown in FIGURE 3, for instance. The large quantities of gas and vapor obtained, and also the low value of the recovered heat at such a low pressure in the surface condenser, must be taken into consideration when designing the apparatus.

FIGURE 2 relates to application of the arrangement shown in Fig. 39, page 488, Chapter 5, of the textbook Pulp and Paper Manufacture, volume 1 by J. Newell Stephenson (McGraw-Hill, New York, 1950), modified for washing pulp with dirty water. The blow vapor from the blow tank or diffuser is passed through a separator to remove pulp and black liquor and then enters pipe 30 having a diameter of 150 mm., passing through it at a flow rate of 10–15 m./sec. and at 85° C. and a pressure of 760 mm. Hg the volume ratio is 0.75–0.30 l./m.$^3$ which gives a load of 450–300 l./min./m.$^2$, the vapors flow to a jet condenser 31, which in the embodiment according to FIGURE 2 is of the closed type. The condensate and uncondensible gases then pass to the hot water cistern 32, from which the uncondensed gases are drawn off through pipe 33. In order to use this process to advantage an additional jet condenser 34 is interposed in pipe 33. The condenser 34 takes coolant water from the cold part of the hot water cistern via pipe 35 with pump 36 or alternatively, particularly if the water is too hot, the condenser 34 can be supplied with a suitably controlled quantity of cooler or purer water, so that the exhausted gas emerging from the condenser 34 has substantially the same temperature as the water. The water from the condenser 34 then passes to the cold part of the hot water cistern via pipe 37. The cold non-condensible vapors from the condenser 34 (temperature preferably below 40° C.) leave the condenser via pipe 29 to a drip trap 38. Pipe 28 connects the drip trap 38 with the coalescer 41, and has a diameter of 100 mm. At the end of pipe 28, alkali solution is injected through nozzle 39, 40 in a volume ratio of 0.5 l./m.$^3$ into the vapors, which are flowed through pipe 28 at a rate of 12 m./sec. and at 50° C., and a pressure of 770 mm. of Hg, and the droplets subsequently are agglomerated in coalescer 41 and allowed to run into a white liquor tank (not shown) via separator 42 and pipe 43. The liquor fed to the tank had a pH of 9 to 10. Better results can be achieved with this recovery process by also using a surface condenser as indicated in FIGURE 1, but the arrangement described here is that which is generally expected to be economically justifiable.

The remaining uncondensible gases contain such small quantities of dimethyl sulphide and other substances that they seldom cause any inconvenience. If required, however, this gas can be mixed with air and supplied to a boiler or lime kiln by fan 44 and burned, air being admitted at 45, or oxidtzed in some other way. The exhaust fan should be automatically disconnected when the temperature of the gas from the condenser 34 exceeds 50° C. The system has a safety cover 46 at the top of pipe 33 which allows the vapor to escape freely if the water pump 36 to the first condenser 31 stops working.

If clean washing water is to be used for pulp washing the hot contaminated water is cooled in the heat exchanger and dumped. A suitable measure to avoid water pollution is then to remove this condensate as hot as possible, and strip it after acidification to pH 6 or lower, suitably under vacuum, whereupon the vapors are treated in the manner described in FIGURE 1, optionally together with the degassing vapor from the evaporation.

FIGURE 3 shows the way in which a relief vapor is treated. The vapor, after having passed a liquor trap (not shown) in which it is carefully treated to remove traces of black liquor and pulp, is passed via pipe 49 through a coalescer and drip trap 50, and then into pipe 53 at a flow rate of 20 m./sec. and a pressure of 1000 mm. Hg. Pipe 53 leads to a second coalescer and drip trap 54. At the end of pipe 53 white liquor at a temperature of 85° C. is injected at a volume ratio of 0.15 l./m.$^3$ through nozzles 51 and 52. The atomized alkali is entrained in the vapors and is separated in drip trap 54. The alkali temperature is low enough, so that a minor portion of the vapor is condensed, to facilitate absorption. Greater condensation should be avoided, since this may involve complications insofar as substances of low volatility may condense in the alkali. The vapor from the drip trap 54 is conducted through pipe 55 to a condenser (not shown) and condensed in the ordinary way. The liquid separated in trap 54 has a pH of 8, and is conducted through a vapor trap 56 to the white liquor tank (not shown) while that separated in vapor trap 50 is passed through trap 57 to the black liquor tank (not shown).

Example 1

An apparatus according to FIGURE 1 was used for scrubbing degassing vapors from an installation for black liquor evaporation, with a capacity corresponding to 1000 tons of pulp per day. The temperature of the vapors was 80° C., the pressure 380 mm. Hg, and the flow 2.4 m.$^3$ per sec. The vapor composition before treatment was:

|  | Percent by volume |
|---|---|
| $H_2O$ | 96.4 |
| $H_2S$ | 3.4 |
| $CH_3SH$ | 0.2 |
| $(CH_3)_2S$ | 0.02 |
| $(CH_3)_2S_2$ | 0.002 |

The vapors were introduced via a tube with 275 mm. diameter with a velocity of 40 m. per sec., and were scrubbed with a water silution of sodium hydroxide containing 180 g. NaOH per l. The alkali solution was introduced through three full cone nozzles with a pressure of 2.0 kg. per cm.$^2$ and in a quantity of 13 l. per min. per nozzle, corresponding to a ratio of liquor: gas of 0.27 l. per m.$^3$ and an area load in the tube of 670 l. per min. and m.$^2$.

The mixture of gas and liquid was led to a surface condenser with 50 m.$^2$ area, in which a partial condensation of the water vapor took place and the temperature of the gas mixture was decreased to 50° C. corresponding to a total pressure of 100 mm. Hg.

The vapor composition after the treatment was:

$H_2O$—98.7 percent by volume (corresponding to 28 percent of the initial quantity).

$H_2S$—1.2 percent by volume (corresponding to 10 percent of the initial quantity).

$CH_3SH$—0.08 percent by volume (corresponding to 33 percent of the initial quantity).

$(CH_3)_2S$—0.04 percent by volume (corresponding to 67 percent of the initial quantity).

$(CH_3)_2S_2$—0.006 percent by volume (corresponding to 80 percent of the initial quantity).

The flow was 0.7 m.$^3$ per sec.

The absorption liquor was separated in a vessel with 700 mm. diameter, tangential inlet, outlet for gases at the top of the separator, and for liquor at its bottom.

The liquor composition after the treatment was:

| | | |
|---|---|---|
| Total alkali (calculated as NaOH) | g./l. | 100 |
| NaOH | g./l. | 10 |
| $Na_2S$ | g./l. | 90 |
| pH | | 11.5 |

The absorption liquor was transferred to the digester department and added to the white liquor without any further treatment.

At another occasion a soda solution was used as scrubbing liquor, containing 240 g. $Na_2CO_3$ per l. corresponding to 180 g. active alkali per l. calculated as NaOH. The absorption liquor was introduced through three full cone nozzles with a pressure of 4.0 kg. per cm.² and in a quantity of 25 l. per min, per nozzle, corresponding to a ratio of liquor: gas of 0.54 l. per m.³ and an area load in the tube of 1450 l. per min. and m.².

The vapor composition after the treatment was:

$H_2O$—97.6 percent by volume (corresponding to 28 percent of the initial quantity).
$H_2S$—1.8 percent by volume (corresponding to 15 percent of the initial quantity).
$CH_3SH$—0.53 percent by volume (corresponding to 67 percent of the initial quantity).
$(CH_3)_2S$—0.04 percent by volume (corresponding to 67 percent of the initial quantity).
$(CH_3)_2S_2$—0.06 percent by volume (corresponding to 80 percent of the initial quantity).

The liquor composition after the treatment was:

| | |
|---|---|
| Total alkali (calculated as NaOH) g./l__ | 130 |
| $Na_2CO_3$ g./l__ | 96 |
| $NaHCO_3$ g./l__ | 60 |
| NaHS g./l__ | 40 |
| pH | 8.2 |

The liquor was transferred to the causticizing department, mixed into the green liquor, causticized in the conventional manner, and used in the digestion process.

In order to make the scrubbing with the same result in a conventional spray tower with a gas velocity of 1.2 m. per sec. and a liquor load of 60 l. per min. and m.² a tower with 1.6 m. diameter and 4 m. height would have been necessary. The necessary liquor load, 100 l. per min., would have necessitated a recirculation of the liquor 2.5 times. With a packed tower recirculation could be avoided, but then the tower diameter has to be increased to 2.2 m.

Example 2

An apparatus according to FIGURE 2 was used for scrubbing vapors from blowing a continuous sulfate digester with a capacity of 700 tons of pulp per day.

The composition of the blow vapors after the jet condenser (item 34 in FIGURE 2) was:

| | Percent by volume |
|---|---|
| $H_2O$ | 12.3 |
| $H_2S$ | 0.2 |
| $CH_3SH$ | 0.2 |
| $(CH_3)_2S$ | 0.2 |
| $(CH_3)_2S_2$ | 0.1 |
| $N_2$ | 87.0 |

The vapor flow was 0.20 m.³ per sec., the temperature 49° C., and the pressure 760 mm. Hg.

The vapors were transferred from the condenser (item 34) and demister (item 38) to a tube with 150 mm. diameter giving a velocity of 11 m. per sec. and were scrubbed with weak white liquor with a concentration of 40 g. active alkali per l. calculated as NaOH and the following composition:

| | |
|---|---|
| NaOH g./l__ | 27 |
| $Na_2S$ g./l__ | 13 |
| $Na_2SO_4$ g./l__ | 2 |
| pH | 14.1 |

The scrubbing liquor was introduced through two full cone nozzles with a pressure of 2.5 kg. per cm.² and in a quantity of 3 l. per min. per nozzle, corresponding to a ratio of liquor: gas of 0.50 l. per m.³ and an area load in the tube of 340 l. per min. and m.².

The mixture of gas and liquor was transferred to a separator with 350 mm. diameter, tangential inlet, outlet for the gases at its top and for the liquor at its bottom.

The vapor composition after the treatment was:

$H_2O$—11.0 percent by volume (corresponding to 90 percent of the initial quantity).
$H_2S$—0.05 percent by volume (corresponding to 25 percent of the initial quantity).
$CH_3SH$—0.07 percent by volume (corresponding to 35 percent of the initial quantity).
$(CH_3)_2S$—0.13 percent by volume (corresponding to 65 percent of the initial quantity).
$(CH_3)_2S_2$—0.07 percent by volume (corresponding to 70 percent of the initial quantity).
$N_2$—88.7 percent by volume (corresponding to 100 percent of the initial quantity).

The liquor composition after the treatment was:

| | |
|---|---|
| NaOH g./l__ | 7 |
| $Na_2S$ g./l__ | 33 |
| $Na_2SO_4$ g./l__ | 2 |
| pH | 10.5 |

The liquor was transferred to the boiler house and used for dissolving the melt from the recovery boiler under formation of green liquor, which was then causticized in the conventional manner and used in the digestion process.

Example 3

A flow of 2 m.³ per h. of condensates emanating from pressure relieving of discontinuous sulfate digesters, and containing 2.0 g. $H_2S$ per l. and 0.5 g. $CH_3SH$ per l., were heated to boiling temperature and stripped with 700 kg. per h. of fresh steam with a pressure of 3 kg. per cm.² in a column with 1.1 m. diameter and 12 bubble cup plates. The water phase leaving the lower part of the column contained 0.15 g. $H_2S$ per l. and 0.10 g. $CH_3SH$ per liter, and was cooled by heat exchanging to the entering condensate stream.

The vapors from the upper part of the column had a temperature of 120° C., and a pressure of 2.0 kg. per cm.², and were treated in an apparatus designed according to FIGURE 3.

The vapor composition before the treatment was:

| | Percent by volume |
|---|---|
| $H_2O$ | 98.2 |
| $H_2S$ | 1.5 |
| $CH_3SH$ | 0.23 |

The vapors were introduced into a tube with 100 mm. diameter with a velocity of 17 m. per sec., and were scrubbed with green liquor with the following composition:

| | |
|---|---|
| Total alkali (calculated as NaOH) g./l__ | 160 |
| $Na_2CO_3$ g./l__ | 140 |
| $Na_2S$ g./l__ | 50 |
| $Na_2SO_4$ g./l__ | 8 |
| pH | 13.8 |

The liquor was introduced through three full cone nozzles with a pressure of 3.5 kg. per cm.² and in a quantity of 2.7 l. per min. per nozzle, corresponding to a ratio of liquor:gas of 1.00 l. per m.³ and an area load of 1000 l. per min. and m.².

The mixture of gas and liquor was transferred to a separator with 350 mm. diameter, tangential inlet, outlet for the gas at its top and for the liquor at its bottom.

The vapor composition after the treatment was:

$H_2O$—99.7 percent by volume (corresponding to 95 percent of the initial quantity).
$H_2S$—0.24 percent by volume (corresponding to 15 percent of the initial quantity).
$CH_3SH$—0.09 percent by volume (corresponding to 40 percent of the initial quantity).

The absorption liquor composition after the treatment was:

| | |
|---|---|
| Total alkali (calculated as NaOH) _____g./l__ | 147 |
| $NaHCO_3$ _____g./l__ | 101 |
| $Na_2S$ _____g./l__ | 46 |
| NaHS _____g./l__ | 67 |
| $Na_2SO_4$ _____g./l__ | 7.4 |
| pH _____ | 8.0 |

Having regard to the foregoing disclosure, the following is claimed as the inventive and patentable embodiments thereof:

1. A method of removing volatile acidic compounds such as hydrogen sulphide and mercaptans from vapors containing the same, which are produced during the sulphate cellulose pulping process, which comprises atomizing an aqueous alkali solution into a stream of the vapors containing the volatile acidic compounds in a volume ratio of alkali solution:vapor within the range from about 0.15 to about 1 l./m.$^3$ while passing the stream at a rate of at least 5 m./sec. at an alkali solution load of at least 250 l./min./sq. m., to ensure complete wetting of the vapor and to form a final alkali solution having a pH of at least 8, and extracting the acidic compounds into such solution, while the atomized solution is entrained in the stream of the vapors; separating the solution from the vapors, and withdrawing the remaining vapors separately.

2. A method according to claim 1, in which the vapors to be treated and the alkali solution are supplied at a sufficiently high concentration of the volatile acidic compounds and alkali, respectively, to yield a final alkali solution containing at least 25 grams of active alkali per liter.

3. A method according to claim 1, wherein the process is carried out in stages, using in the first stage an amount of alkali solution insufficient to provide total absorption of the acidic compounds, and in a succeeding stage introducing a further supply of alkali solution, suitably adjusting the amounts of the alkali solutions added in the various stages so that the acidic compounds are recovered in accordance with their acidity and volatility.

4. A method according to claim 1, wherein at least part of the separated alkali solution is recirculated within the system.

5. A method according to claim 1, wherein the alkali solution obtained, after adjustment of the alkali concentration, if necessary, by evaporation or dilution, is used for the manufacture of polysulphide solution.

6. A method according to claim 1, wherein white liquor is used as the alkali solution.

7. A method according to claim 1, wherein the alkali solution is green liquor.

8. A method according to claim 1, wherein the alkali solution is aqueous sodium hydroxide.

9. A method according to claim 1, wherein the alkali solution is aqueous sodium carbonate.

10. A method according to claim 1, wherein the vapor is condensed at least in part after the introduction of the alkali solution and prior to separation thereof.

11. A process according to claim 1, in which the vapors are at a pressure within the range of from about 0.1 to about 10 atm.

12. A process according to claim 1, in which the vapors are at a temperature within the range from about 35 to about 200° C.

References Cited

UNITED STATES PATENTS

| | | | |
|---|---|---|---|
| 1,440,026 | 12/1922 | Nilsson | 23—2 |
| 1,799,177 | 4/1931 | Perry | 23—2 |
| 1,854,428 | 4/1932 | Segerfelt | 23—2 |
| 2,810,627 | 10/1957 | Johnstone et al. | 23—2 X |

EARL C. THOMAS, *Primary Examiner.*